US 7,519,221 B1

(12) United States Patent
Nicholson

(10) Patent No.: US 7,519,221 B1
(45) Date of Patent: Apr. 14, 2009

(54) RECONSTRUCTING HIGH-FIDELITY ELECTRONIC DOCUMENTS FROM IMAGES VIA GENERATION OF SYNTHETIC FONTS

(75) Inventor: Dennis G. Nicholson, Atherton, CA (US)

(73) Assignee: Adobe Systems Incorporated, San Jose, CA (US)

(*) Notice: Subject to any disclaimer, the term of this patent is extended or adjusted under 35 U.S.C. 154(b) by 825 days.

(21) Appl. No.: 11/069,510

(22) Filed: Feb. 28, 2005

(51) Int. Cl.
*G06K 9/00* (2006.01)
*G06K 9/34* (2006.01)
*G06K 9/18* (2006.01)
*G06K 9/62* (2006.01)

(52) U.S. Cl. .................. 382/181; 382/180; 382/186; 382/209

(58) Field of Classification Search ............ 382/180, 382/181, 209, 186
See application file for complete search history.

(56) References Cited

U.S. PATENT DOCUMENTS

| 4,769,716 A | | 9/1988 | Casey et al. ........... 358/263 |
| 5,956,419 A | * | 9/1999 | Kopec et al. ........... 382/159 |
| 6,069,978 A | * | 5/2000 | Peairs ................... 382/254 |
| 2002/0006220 A1 | * | 1/2002 | Kohchi .................. 382/165 |
| 2004/0202349 A1 | * | 10/2004 | Erol et al. .............. 382/100 |
| 2005/0018906 A1 | * | 1/2005 | Napper .................. 382/186 |
| 2005/0069173 A1 | * | 3/2005 | Morisada et al. ........ 382/103 |

OTHER PUBLICATIONS

Kopec, G.—"Document-Specific Character Template Estimation"—SPIE, 1996, pp. 1-13.*
Xu, Y.—"Prototype Extraction and Adaptive OCR"—IEEE, 1999, pp. 1280-1296.*

* cited by examiner

*Primary Examiner*—Jingge Wu
*Assistant Examiner*—Bernard Krasnic
(74) *Attorney, Agent, or Firm*—Robert C. Kowert; Meyertons, Hood, Kivlin, Kowert & Goetzel, P.C.

(57) ABSTRACT

A system creates an electronic version of a document from page-images of the document, wherein the electronic version replicates both the logical content and the physical appearance of the original document. During operation, the system receives the page-images for the document. Next, the system extracts character images from the page-images, and generates a synthetic font for the document from the extracted character images. Finally, the system constructs the electronic version of the document by, using the synthetic font to represent text regions of the document, and by using image-segments extracted from the pages-images to represent non-text regions of the document.

19 Claims, 4 Drawing Sheets

RECONSTRUCTING HIGH-FIDELITY ELECTRONIC DOCUMENTS FROM IMAGES VIA GENERATION OF SYNTHETIC FONTS

BACKGROUND

1. Field of the Invention

The present invention relates to methods for representing documents within a computer system. More specifically, the present invention relates to a method and an apparatus for generating a synthetic font to facilitate creation of an electronic document from scanned page-images, wherein the resulting electronic document reproduces both the logical content and the physical appearance of the original document.

2. Related Art

As businesses and other organizations become increasingly more computerized, they are beginning to store and maintain electronic versions of paper documents on computer systems. The process of storing paper documents on a computer system typically involves a "document imaging" process, which converts the paper documents into electronic documents. This document imaging process typically begins with an imaging step, wherein document page-images are generated using a scanner, a copier, or a camera. These page-images are typically analyzed and enhanced using a computer program before being assembled into a document container, such as an Adobe® Portable Document Format (PDF) file.

A number of formats are presently used for document imaging. These formats include: (1) plain image, (2) searchable image (SI), and (3) formatted text and graphics (FT&G). The "plain-image" format provides a bitmap representation of the image, which is quite useful for archival applications, such as check processing.

The searchable image (SI) format uses scanned images for document display (e.g., in a document viewer), and uses invisible text derived from the scanned images for document search and retrieval. There are two common flavors of searchable image: (1) SI (exact); and SI (compact). SI (exact) maintains a bit-for-bit copy of the scanned pages, whereas SI (compact) applies lossy compression to the original page-images to produce smaller but nearly identical "perceptually lossless" page-images for document display.

Formatted text and graphics (FT&G) uses, formatted text, graphical lines, and placed images to construct representations of the original page-images. FT&G can be "uncorrected," which means it includes suspects (word images+ hidden text) in place of formatted text for low-confidence optical character recognition (OCR) results. Alternatively, FT&G can be "corrected" by manually converting suspects to formatted text. (Note that the term "OCR" refers to the process of programmatically converting scanned blobs into corresponding ASCII characters.)

When determining which document imaging format to use, a user typically considers a number of attributes of interest. For example, the attributes of interest can include the following:

(1) Display fidelity—Does the display version of the electronic document look exactly like the original scan?
(2) Display quality—Is the display version of the electronic document easy to read?
(3) Display performance—Does poor display performance (e.g., page display speed) detract from viewer satisfaction?
(4) Searchability—Can relevant text be found within a document collection and within individual documents?
(5) Production cost—How much does the document imaging process cost (both in equipment cost and manual labor)?
(6) Reflow—Will document reflow be possible to enable viewing on mobile device?
(7) Accessibility—Is the document accessible by vision-impaired users?
(8) File size—How big is the file (smaller is better)?

With respect to these attributes, the above-described image formats generally perform as follows:

(1) Display fidelity—SI (exact) is best; SI (compact) is OK; FT&G (corrected) is good; FT&G (uncorrected) is fair.
(2) Display quality—FT&G (corrected) is best; FT&G (uncorrected) is good; SI formats are poor.
(3) Display performance—FT&G formats are best; SI formats are fair.
(4) Searchability—FT&G (corrected) is best; others are good.
(5) Production cost—FT&G (uncorrected) and SI formats are best (i.e., cheapest); FT&G (corrected) is worst.
(6) Reflow—FT&G (corrected) is best; FT&G (uncorrected) is fair; SI formats are worst (i.e., not reflowable).
(7) Accessibility—FT&G (corrected) is best; FT&G (uncorrected) is poor; SI formats are worst (i.e., not accessible).
(8) File size—FT&G (corrected) is best (i.e., smallest); FT&G (uncorrected) is good; SI (compact) is fair; SI (exact) is poor.

As can be seen from the list above, each of these document imaging formats has unique advantages compared to the other formats. Hence, when a user has to choose one of the document imaging formats, the user typically has to forego advantages that the user would like to have from the other formats.

Hence, what is needed is a method and an apparatus for obtaining the advantages of all of the existing document imaging formats within a single document imaging format.

SUMMARY

One embodiment of the present invention provides a system that creates an electronic version of a document from page-images of the document. During operation, the system receives the page-images for the document. Next, the system extracts character images from the page-images, and generates a synthetic font for the document from the extracted character images. Finally, the system constructs the electronic version of the document by using the synthetic font to represent text regions of the document, and by using image-segments extracted from the pages-images to represent non-text regions of the document.

In a variation on this embodiment, generating the synthetic font involves: producing glyphs from the extracted character images; obtaining character labels for the glyphs; and using the glyphs and associated character labels to form the synthetic font.

In a further variation, obtaining character labels for the glyphs involves performing an optical character recognition (OCR) operation on the glyphs.

In a further variation, producing glyphs from the extracted character images involves statistically analyzing extracted character images which are similar to each other to ensure that the character images fall into homogenous clusters.

In a further variation, the statistical analysis is based on an inter-character distance metric.

In a further variation, producing glyphs from the extracted character images involves converting the extracted character images to grayscale. Next, the system iteratively: registers extracted character images in each cluster with sub-pixel accuracy; extracts a high-resolution, noise-reduced prototype from the registered character images for each cluster; measures a distance from each registered character image to its associated prototype, and uses the measured distances to purify each cluster via histogram analysis of inter-cluster and intra-cluster distances.

In a further variation, extracting the noise-reduced prototype from the registered character images for a given cluster involves averaging registered character images in the given cluster to produce a reduced-noise glyph which is representative of the given cluster.

DETAILED DESCRIPTION

Figure 1:
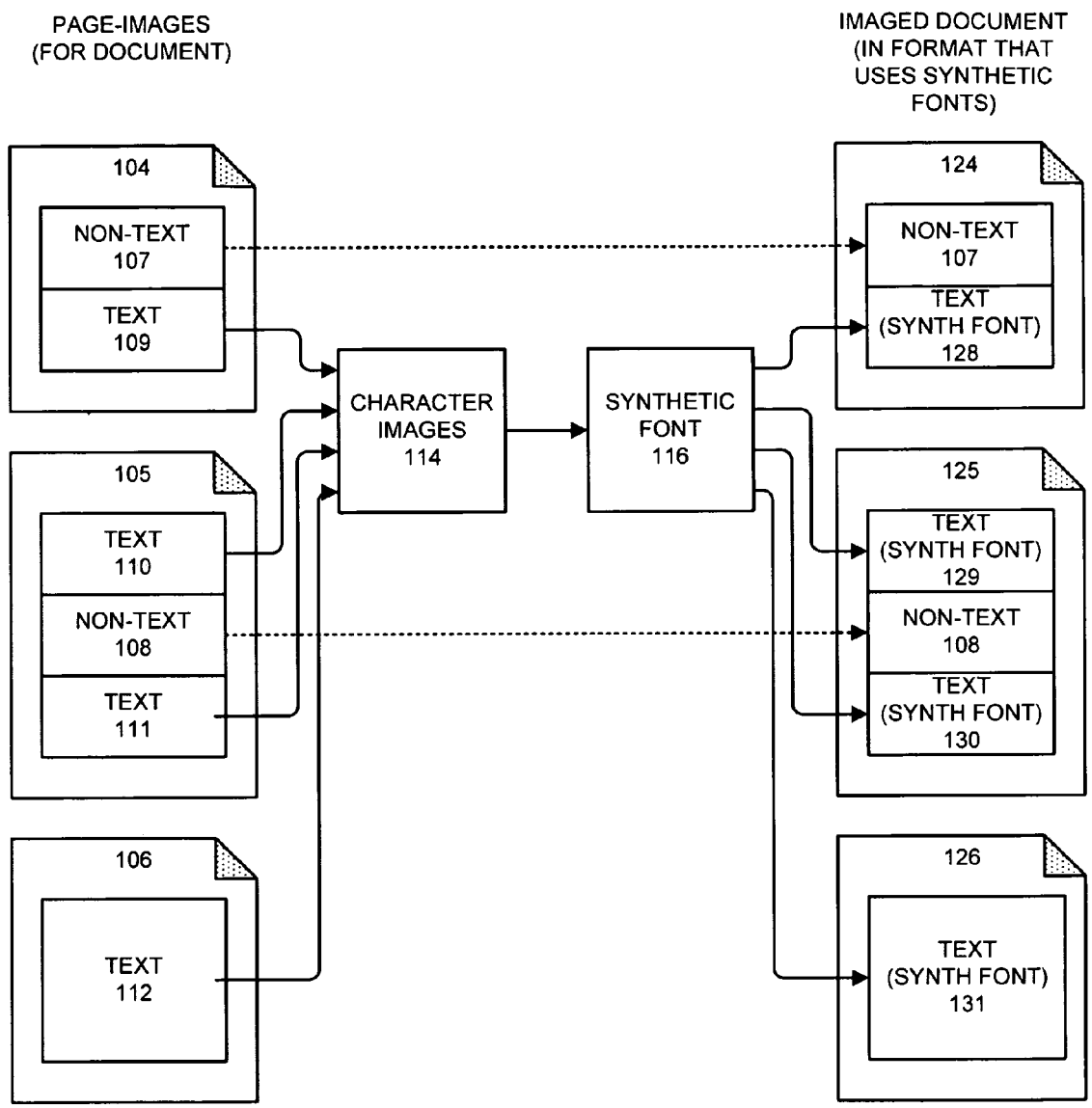
FIG. 1 illustrates a document imaging process in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Document Imaging Process

The present invention provides a technique for generating a new universal document imaging format, which provides the combined advantages of current document imaging formats. In particular, the new document imaging format provides the low-production cost and reliable fidelity of image-based formats. At the same time, the new format provides the small file size, superior display quality, performance, reflowability, and accessibility of formatted-text based formats. Additionally, techniques to generate the new document format facilitate enhanced OCR accuracy, which in turn results in improved searchability.

During the electronic document creation process, character images are extracted from the page-images. (Note that the term "character images" and the process of extracting character images for optical character recognition (OCR) purposes are well-known in the art.) Similar character images are combined to statistically remove noise and other artifacts introduced by the printing and imaging (e.g., scanning) processes. The resulting high-resolution, type-set quality glyphs are then labeled via OCR, and the labeled glyphs are used to construct synthetic document-specific fonts. Finally, the electronic document is constructed using the synthetic fonts to precisely duplicate text regions and image-segments extracted from the page-images to duplicate non-text regions. The result is a document that is perceptually identical to the original printed document, but is created using a common font mechanism so that the document text is searchable, selectable, reflowable, accessible, etc. This electronic document generally looks better than the scanned images due to statistical removal of noise from the imaged glyphs.

FIG. 1 illustrates this new document imaging process. The system first receives a set of page-images 104-106 for a document, which are illustrated on the left-hand side of FIG. 1. These page-images can contain text regions and non-text regions. More specifically: page-image 104 contains non-text region 107 and text region 109; page-image 105 contains text regions 110-111 and non-text region 108; and page-image 106 contains text region 112.

Figure 2:
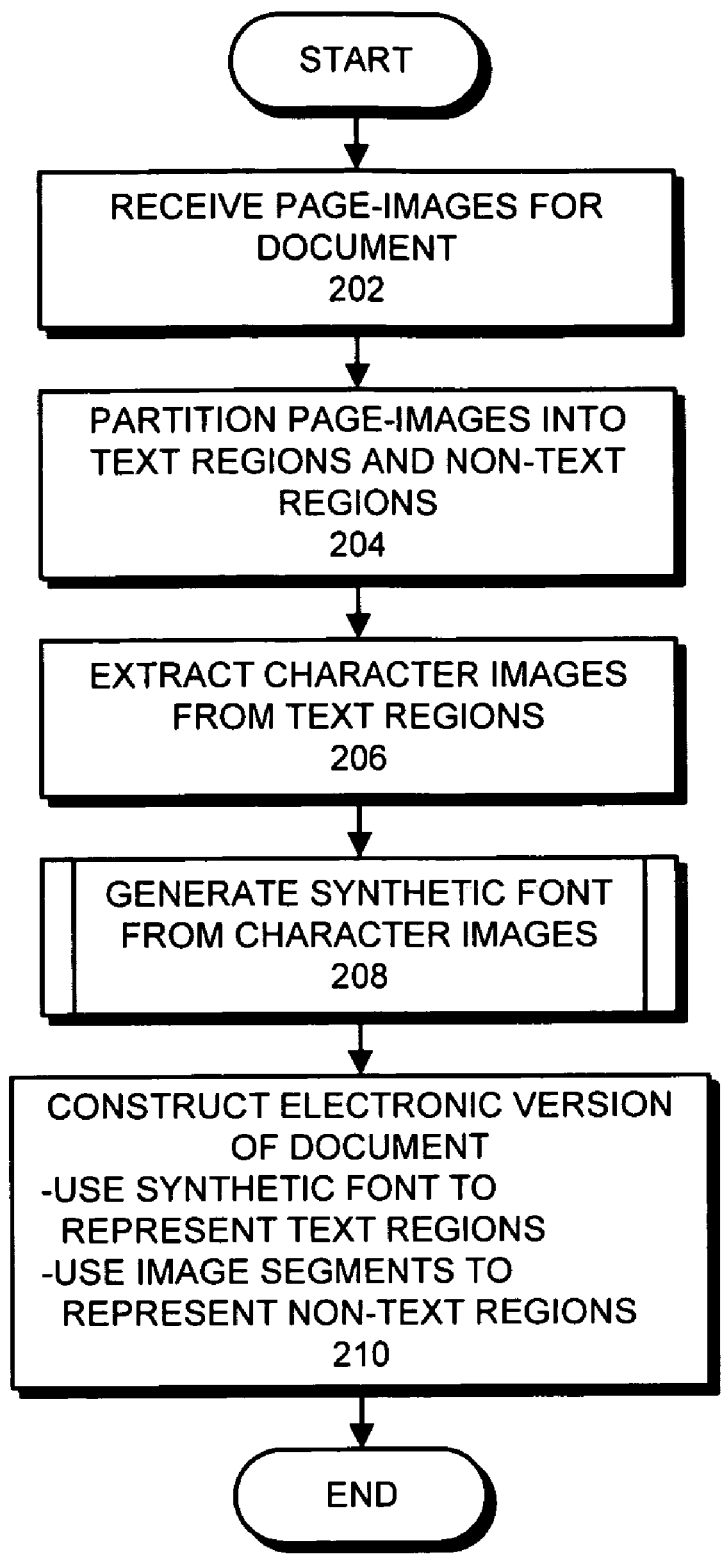
FIG. 2 presents a flow chart of the document imaging process in accordance with an embodiment of the present invention.

During the document imaging process, character images 114 are extracted from the text regions. These character images are analyzed to generate a synthetic font 116. This synthetic font 116 is then used to represent text regions 109-112 from page-images 104-106, thereby forming corresponding "converted" text regions 128-131 in the "imaged" document, which comprises page-images 124-126. Note that image-segments from non-text regions 107-108 are simply transferred without significant modification from page-images 104-105 to corresponding page-images 124-125. This process is described in more detail below with reference to the flow chart in FIG. 2.

First, the system receives page-images for the document (step 202). Note that these page-images, which are also referred to as "scanned images," can be created using a scanner, copier, camera, or other imaging device. Next, the system partitions the page-images into text regions and non-text regions (step 204). There exist a number of well-known techniques to differentiate text regions from non-text regions, so this step will not be discussed further.

The system subsequently extracts character images from the text regions (step 206). (This is a well-known process, which is widely used in OCR systems.) The system then generates a synthetic font from the character images, through a process which is described in more detail below with reference to FIGS. 3 and 4 (step 208).

Finally, the system constructs the new electronic version of the document. This involves using the synthetic font to precisely duplicate the text regions of the document, and using image-segments extracted from the pages-images to represent non-text regions of the document (step 210).

Note that OCR errors that arise during this process will have the same effect as they do in searchable image formats. That is, the glyph will appear as the noise-reduced scanned glyph, but that glyph will be mislabeled. For example, an "I" might be mislabeled as a "1". In this case, viewers will see the scanned "I" but a search for an ASCII "I" will not find the "I".

Synthetic Font Creation

Figure 3:
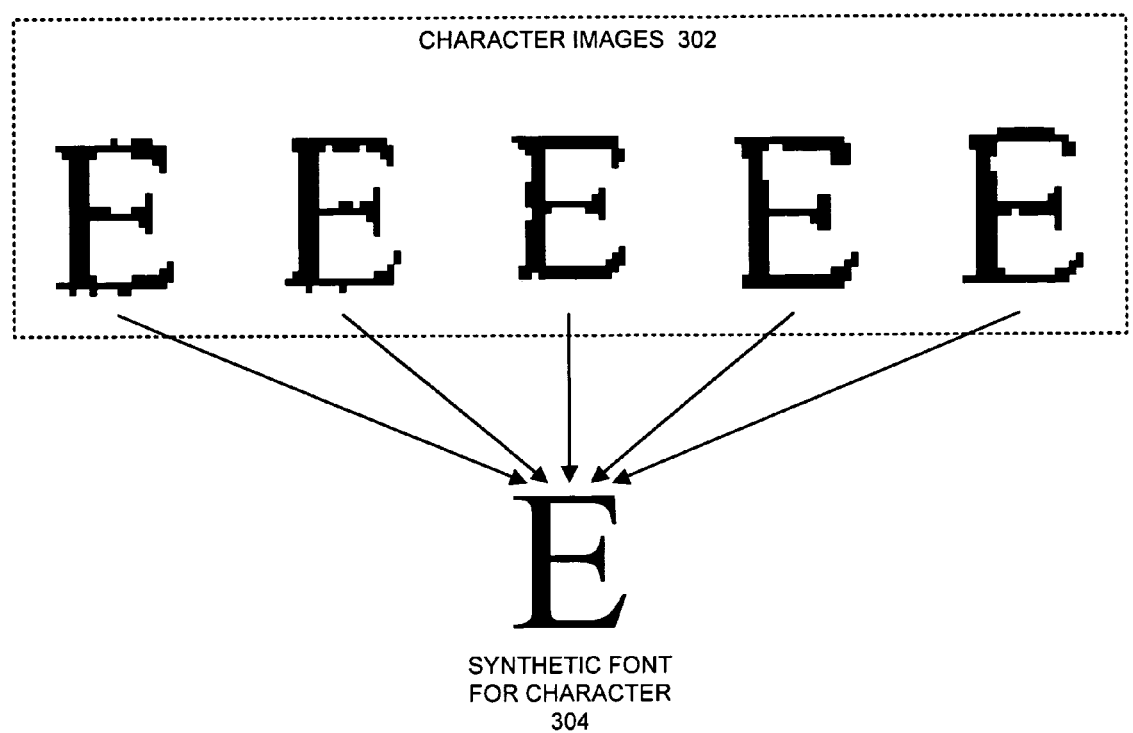
FIG. 3 illustrates how a synthetic font is created from character images in accordance with an embodiment of the present invention.

FIG. 3 illustrates how a synthetic font is created from character images in accordance with an embodiment of the present invention. This iterative process involves classifying the character images into clusters containing similar character images. The character images 302 in a given cluster are then combined using statistical techniques to form a glyph in a synthetic font 304 for the character. Although the character images 302 have a significant amount of noise from the scanning process, the statistical techniques can significantly reduce this noise to produce a relatively clean synthetic font 304.

Figure 4:
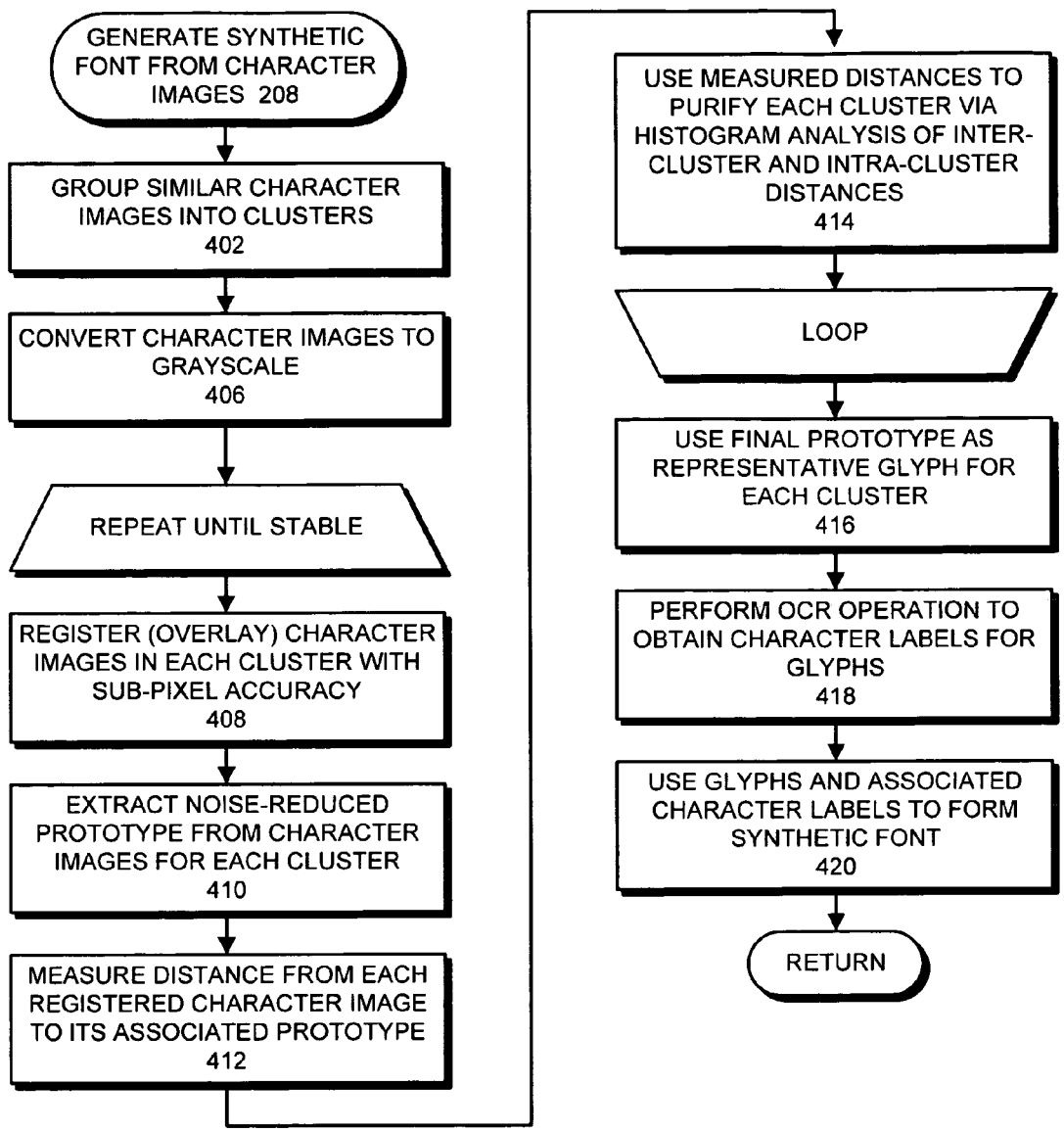
FIG. 4 presents a flow chart illustrating how a synthetic font is generated in accordance with an embodiment of the present invention.

FIG. 4 presents a flow chart illustrating how a synthetic font is generated from character images in accordance with an embodiment of the present invention. First, the system groups similar character images into clusters (step 402). Next, the system converts the character images to grayscale, which can involve using any one of a number of different conversion techniques (step 406).

The system then performs an iterative process, which involves a number of steps. First, the system overlays the character images in each cluster with sub-pixel accuracy (step 408). Note that this involves registering the character images with each other at a resolution finer than a pixel. There are a number of ways to do this, such as up-sampling the pixels so that each pixel becomes 4 or 16 pixels.

Next, the system extracts a noise-reduced prototype from the character images for each cluster (step 410). The system then measures the distance from each registered character image to its associated prototype (step 412). Then, the system uses the measured distances to purify each cluster through a histogram analysis of inter-cluster and intra-cluster distances (step 414). This iterative process is repeated until the clusters are stable.

Note that any one of a number of well-known distance metrics (from various pattern-recognition techniques) can be used to measure the distance between a given registered character image and its corresponding prototype. For example, the system can perform an exclusive-OR operation between the character image and the prototype, and can count the number of bits that differ between them. Of course, other, more-sophisticated distance metrics can be used instead of a simple bit difference. Ideally the distance metric correlates with perceived visual difference.

The histogram analysis generally ranks the character images by distance from the prototype. If necessary, the clusters are "purified" by removing character images that are a large distance from the prototype. These removed character images can then be re-clustered, so that they fall into different and/or new clusters.

Next, the system uses the final prototype for each cluster as the representative glyph for the cluster (step 416). The system also performs a standard OCR operation to obtain character labels for each representative glyph (step 418). Note that if this OCR operation is not accurate, it is possible for a glyph to be associated with an erroneous character label. Hence, if possible, it is desirable to perform a manual correction on these character label assignments. If it is not possible to correct character assignment, the representative glyph will still provide an accurate visual representation of the character, even if the assigned character label is not accurate.

Finally, the representative glyphs and associated character labels are used to form the synthetic font (step 420).

Note that synthetic fonts may have multiple glyphs for each "character" to preserve the perceptually lossless property.

The present invention uses traditional font machinery to construct an image which is perceptually identical to the original printed page. Because of its font-based construction, the electronic document has advantages (e.g., text extraction, reflow, accessibility) not available in image-based formats. Hence, the present invention combines desirable document imaging properties from different formats into a single format.

The techniques described above also include a number of refinements to the synthetic font generation process. These refinements involve: (1) working at increased resolution to achieve precise glyph registration; (2) working with enhanced grayscale glyphs to de-emphasize scanning artifacts; (3) iteratively refining clusters using histogram analysis and pre-computed font base analyses; and (4) employing OCR techniques within the clustering process. These refinements combine to facilitate a significant removal of printing and scanning artifacts resulting in very clean character prototypes, fewer clusters, and virtual elimination of clustering errors. The production of very clean prototypes significantly improves OCR accuracy. Furthermore, the refined techniques result in improved compression due to the smaller number of prototypes per character.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for creating an electronic version of a document, comprising:
 using a computer to perform:
  receiving images for the document;
  extracting character images from the images;
  generating a synthetic font for the document from the extracted character images, wherein generating the synthetic font involves:
   producing glyphs from the extracted character images, wherein producing glyphs from the extracted character images involves grouping similar character images into clusters, and iteratively:
    registering extracted character images in each cluster with sub-pixel accuracy,
    extracting a high-resolution, noise-reduced prototype from the registered character images for each cluster,
    measuring a distance from each registered character image to its associated prototype, and
    using the measured distances to purify each cluster via histogram analysis of inter-cluster and intra-cluster distances;
   obtaining character labels for the glyphs; and
   using the glyphs and associated character labels to form the synthetic font; and
  constructing the electronic version of the document by,
   using the synthetic font to represent text regions of the document, wherein the synthetic font represents both a logical content and a visual appearance of characters in the text regions, wherein the visual appearance of characters in the synthetic font are faithful replicas of corresponding characters on printed pages from which the images were generated, and
   using image-segments extracted from the images for the document to represent non-text regions of the document.

2. The method of claim 1, wherein obtaining character labels for the glyphs involves performing an optical character recognition (OCR) operation on the glyphs.

3. The method of claim 1, wherein using the measured distances to purify each cluster involves statistically analyzing extracted character images which are similar to each other to ensure that the character images fall into homogenous clusters.

4. The method of claim 3, wherein the statistical analysis is based on an inter-character distance metric.

5. The method of claim 1, wherein producing glyphs from the extracted character images further involves:
converting the extracted character images to grayscale prior to said iteratively registering, extracting, measuring and using.

6. The method of claim 1, wherein extracting the noise-reduced prototype from the registered character images for a given cluster involves averaging registered character images in the given cluster to produce a reduced-noise glyph which is representative of the given cluster.

7. A computer-readable storage device storing instructions that when executed by a computer cause the computer to perform a method for creating an electronic version of a document, the method comprising:
receiving images for the document;
extracting character images from the images;
generating a synthetic font for the document from the extracted character images,
wherein generating the synthetic font involves:
producing glyphs from the extracted character images, wherein producing glyphs from the extracted character images involves grouping similar character images into clusters and iteratively:
registering extracted character images in each cluster with sub-pixel accuracy,
extracting a high-resolution, noise-reduced prototype from the registered character images for each cluster,
measuring a distance from each registered character image to its associated prototype, and
using the measured distances to purify each cluster via histogram analysis of inter-cluster and intra-cluster distances;
obtaining character labels for the glyphs; and
using the glyphs and associated character labels to form the synthetic font; and
constructing the electronic version of the document by,
using the synthetic font to represent text regions of the document, wherein the synthetic font represents both a logical content and a visual appearance of characters in the text regions, wherein the visual appearance of characters in the synthetic font are faithful replicas of corresponding characters on printed pages from which the images were generated, and
using image-segments extracted from the images for the document to represent non-text regions of the document.

8. The computer-readable storage device of claim 7, wherein obtaining character labels for the glyphs involves performing an optical character recognition (OCR) operation on the glyphs.

9. The computer-readable storage device of claim 7, wherein using the measured distances to purify each cluster involves statistically analyzing extracted character images which are similar to each other to ensure that the character images fall into homogenous clusters.

10. The computer-readable storage device of claim 9, wherein the statistical analysis is based on an inter-character distance metric.

11. The computer-readable storage device of claim 7, wherein producing glyphs from the extracted character images further involves:
converting the extracted character images to grayscale prior to said iteratively registering, extracting, measuring and using.

12. The computer-readable storage device of claim 7, wherein extracting the noise-reduced prototype from the registered character images for a given cluster involves averaging registered character images in the given cluster to produce a reduced-noise glyph which is representative of the given cluster.

13. A method for generating a synthetic font, comprising:
using a computer to perform:
receiving a set of scanned character images;
producing glyphs from the set of scanned character images, wherein producing glyphs from the set of scanned character images involves grouping similar character images into clusters, and iteratively:
registering scanned character images in each cluster with sub-pixel accuracy,
extracting a high-resolution, noise-reduced prototype from the registered character images for each cluster,
measuring a distance from each registered character image to its associated prototype, and
using the measured distances to purify each cluster via histogram analysis of inter-cluster and intra-cluster distances;
obtaining character labels for the glyphs; and
using the glyphs and associated character labels to form the synthetic font, whereby the synthetic font can represent both a logical content and a visual appearance of characters in a document, wherein the visual appearance of characters in the synthetic font are faithful replicas of corresponding characters on printed pages from which the images were generated.

14. The method of claim 13, wherein obtaining character labels for the glyphs involves performing an optical character recognition (OCR) operation on the glyphs.

15. The method of claim 13, wherein using the measured distances to purify each cluster involves statistically analyzing character images which are similar to each other to ensure that the scanned character images fall into homogenous clusters.

16. The method of claim 15, wherein the statistical analysis is based on an inter-character distance metric.

17. The method of claim 13, wherein producing glyphs from the set of scanned character images further involves, prior to said iteratively registering, extracting, measuring and using:
increasing a resolution of the scanned character images through up-sampling; and
converting the scanned character images to grayscale using an inverse of a scanner modulation transfer function.

18. The method of claim 13, wherein extracting the noise-reduced prototype from the registered character images for a given cluster involves averaging registered character images in the given cluster to produce a reduced-noise glyph which is representative of the given cluster.

19. A computer-readable storage device storing instructions that when executed by a computer cause the computer to perform a method for generating a synthetic font, the method comprising:
receiving a set of scanned character images;
producing glyphs from the set of scanned character images,
wherein producing glyphs from the set of scanned character images involves grouping similar character images into clusters and iteratively:
registering scanned character images in each cluster with sub-pixel accuracy,
extracting a high-resolution, noise-reduced prototype from the registered character images for each cluster,
measuring a distance from each registered character image to its associated prototype, and
using the measured distances to purify each cluster via histogram analysis of inter-cluster and intra-cluster distances;

obtaining character labels for the glyphs; and
using the glyphs and associated character labels to form the synthetic font, whereby the synthetic font can represent both a logical content and a visual appearance of characters in a document, wherein the visual appearance of characters in the synthetic font are faithful replicas of corresponding characters on printed pages from which the images were generated.

\* \* \* \* \*